(12) United States Patent
Abraham et al.

(10) Patent No.: US 7,625,291 B2
(45) Date of Patent: Dec. 1, 2009

(54) TOOL FOR REPAIRING DAMAGED SCREW THREADS

(76) Inventors: Moshe Abraham, Shilo, Mobile Post Ephraim (IL); Zeev Stahl, 43/4 Halm Toren Street, Pisgat Zeev, Jerusalem (IL) 97823; Binyamin Fredkin, Gush Etzioh, P.O. Box 179, Alon Shvut 90433 (IL)

( * ) Notice: Subject to any disclaimer, the term of this patent is extended or adjusted under 35 U.S.C. 154(b) by 63 days.

(21) Appl. No.: 10/591,937

(22) PCT Filed: Mar. 7, 2005

(86) PCT No.: PCT/IL2005/000266

§ 371 (c)(1),
(2), (4) Date: Aug. 8, 2007

(87) PCT Pub. No.: WO2005/084863

PCT Pub. Date: Sep. 15, 2005

(65) Prior Publication Data

US 2008/0039218 A1 Feb. 14, 2008

(30) Foreign Application Priority Data

Mar. 7, 2004 (IL) .................................. 160766

(51) Int. Cl.
*B21J 13/02* (2006.01)
(52) U.S. Cl. .............................. 470/185; 470/67; 470/80
(58) Field of Classification Search .................. 470/57, 470/58, 66, 67, 80, 81, 185, 186, 187, 188, 470/189, 190; 408/215
See application file for complete search history.

(56) References Cited

U.S. PATENT DOCUMENTS

| | | | | |
|---|---|---|---|---|
| 1,854,389 A | * | 4/1932 | Arndt | 30/102 |
| 2,388,790 A | * | 11/1945 | Mackliet | 470/209 |
| 3,688,323 A | * | 9/1972 | Bruck et al. | 470/209 |
| 3,793,659 A | * | 2/1974 | Edgar | 470/209 |
| 4,150,450 A | * | 4/1979 | Laub et al. | 470/209 |
| 5,060,330 A | | 10/1991 | Stahl et al. | |
| 5,224,900 A | * | 7/1993 | Hai | 470/185 |
| 5,733,075 A | | 3/1998 | Basteck et al. | |
| 6,589,122 B1 | | 7/2003 | Chen | |

FOREIGN PATENT DOCUMENTS

GB 778 807 A 7/1957

* cited by examiner

*Primary Examiner*—Edward Tolan
(74) *Attorney, Agent, or Firm*—Bryan Cave LLP

(57) ABSTRACT

There is provided a tool for repair of damaged threads of screws, including a body (2) having a projecting portion (4) for accommodating a screw to be repaired and having two recessed major surfaces; two blades (6, 6'), each having a rear end (32, 32') hingedly articulated in the body (2) and front end in the shape of a cutting face (46, 46') substantially fitting the type of thread to be repaired: means (10, 12) to alter the distance between the cutting faces (46, 46') and the projecting portion (4) to accommodate screws of different diameters, and wherein the rear ends (32, 32') of the blades (6, 6') are configured in such a way that they are capable of serving as pivots, whereby the blades (6, 6') are hingedly articulated to the body (2).

18 Claims, 3 Drawing Sheets

TOOL FOR REPAIRING DAMAGED SCREW THREADS

This application is the National Stage of International Application No. PCT/IL2005/000266, filed Mar. 7, 2005.

FIELD OF THE INVENTION

The present invention relates to a chasing tool for repairing damaged threads of screws.

BACKGROUND OF THE INVENTION

Threads, especially screw threads, are sensitive to damage caused by impact, due to their sharp crests which are easily nicked or otherwise deformed and which, when so damaged, make it difficult to apply nuts or other matching parts. Experienced mechanics are careful not to apply such components forcibly, as their own threads might be damaged in the process. Damaged screw threads should therefore be repaired before, say, reassembly of threaded components. While, in principle, screw threads can be repaired with the aid of threading dies, this could necessitate the acquisition of several large and expensive sets of dies, one set for each of the several thread standards of which, in automotive applications alone, there are at least five. For the average workshop or garage, not to speak of the "do-it-yourself" man in his basement shop, this is quite impractical. It is, of course, also possible to use a triangular file for screw thread repair; this, however, requires a considerable amount of skill, is time-consuming and mostly yields poor results.

Such a tool is disclosed in U.S. Pat. No. 5,060,330, obtained by the present Applicant and incorporated herein by reference.

While this prior-art tool does indeed work satisfactorily, it is relatively bulky and heavy.

DISCLOSURE OF THE INVENTION

It is therefore one of the objects of the present invention to provide a tool for the repairing of damaged threads of screws that is lightweight and slim, simple to handle, easily assembled and relatively inexpensive.

According to the invention, this is achieved by providing a tool for repair of damaged threads of screws, comprising a body having a projecting portion for accommodating a screw to be repaired and having two recessed major surfaces; two blades, each having a rear end hingedly articulated in said body and a front end in the shape of a cutting face substantially fitting the type of thread to be repaired; means to alter the distance between said cutting faces and said projecting portion to accommodate screws of different diameters, and wherein said rear ends of said blades are configured in such a way that they are capable of serving as pivots, whereby said blades are hingedly articulated to said body.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of the tool according to the present invention;

FIG. 2 shows the tool of FIG. 1, with one of the covers removed;

Figure 1:
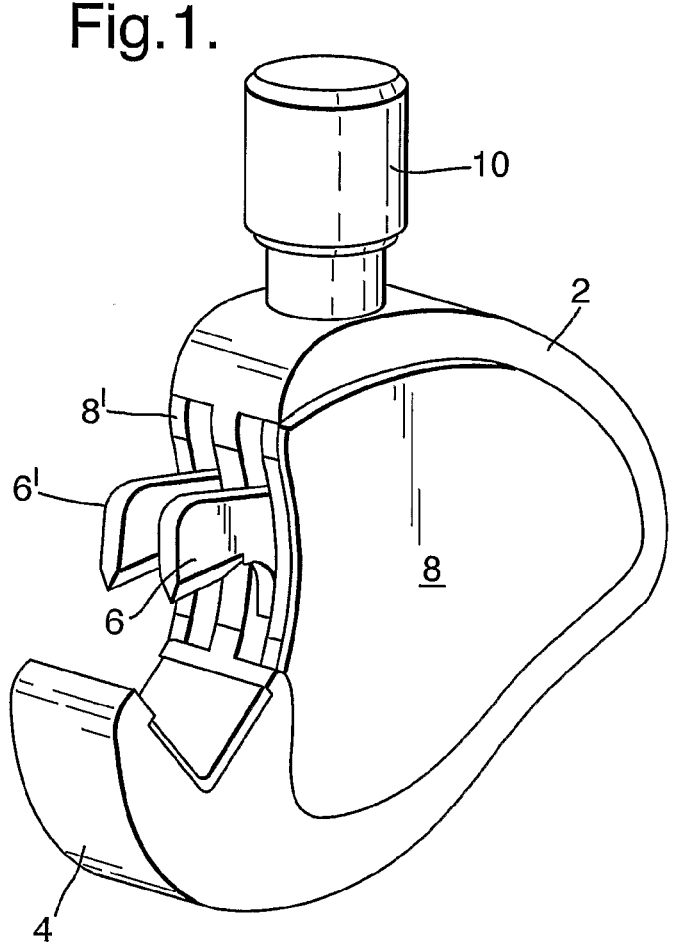
Figure 3:
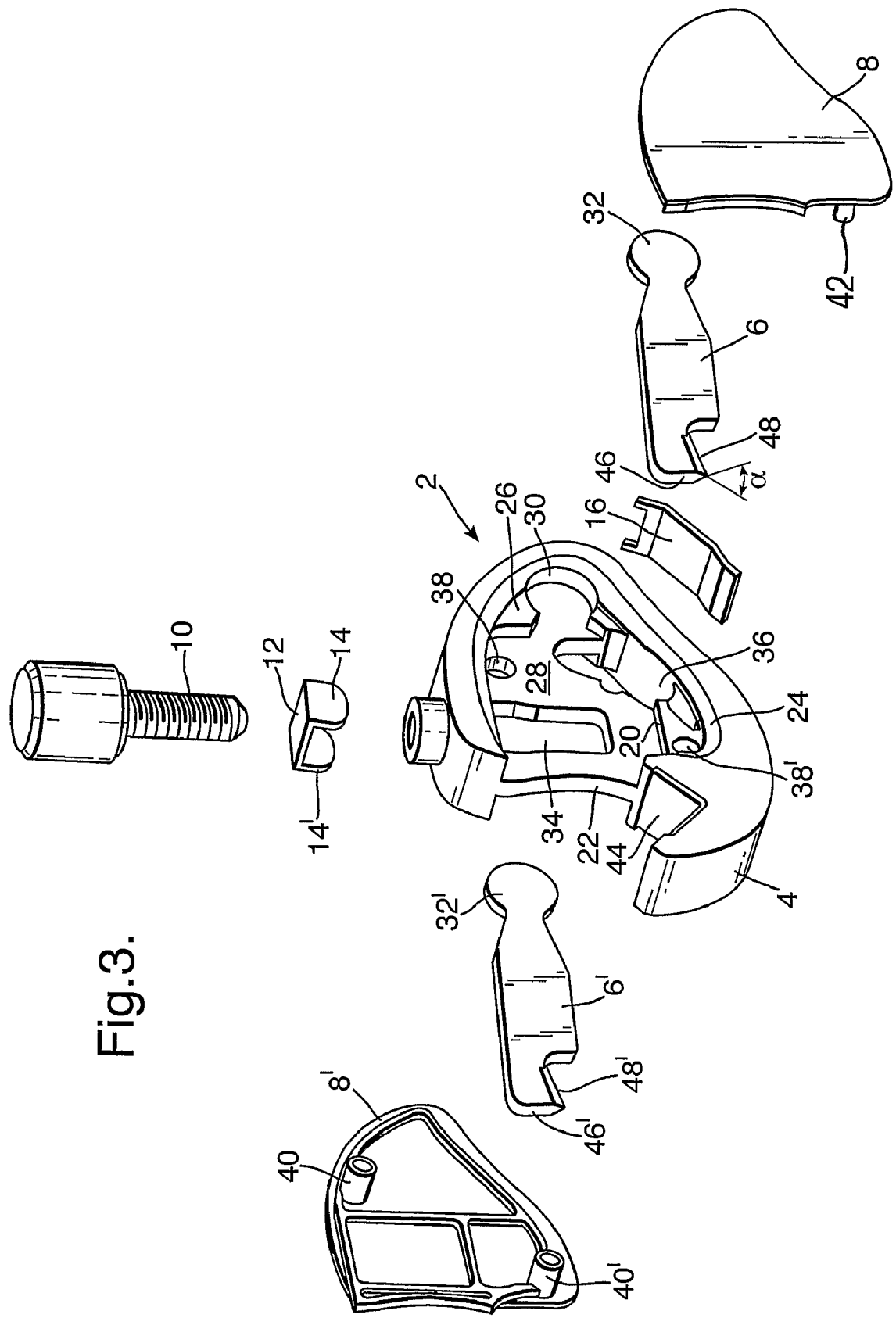
Figure 4:
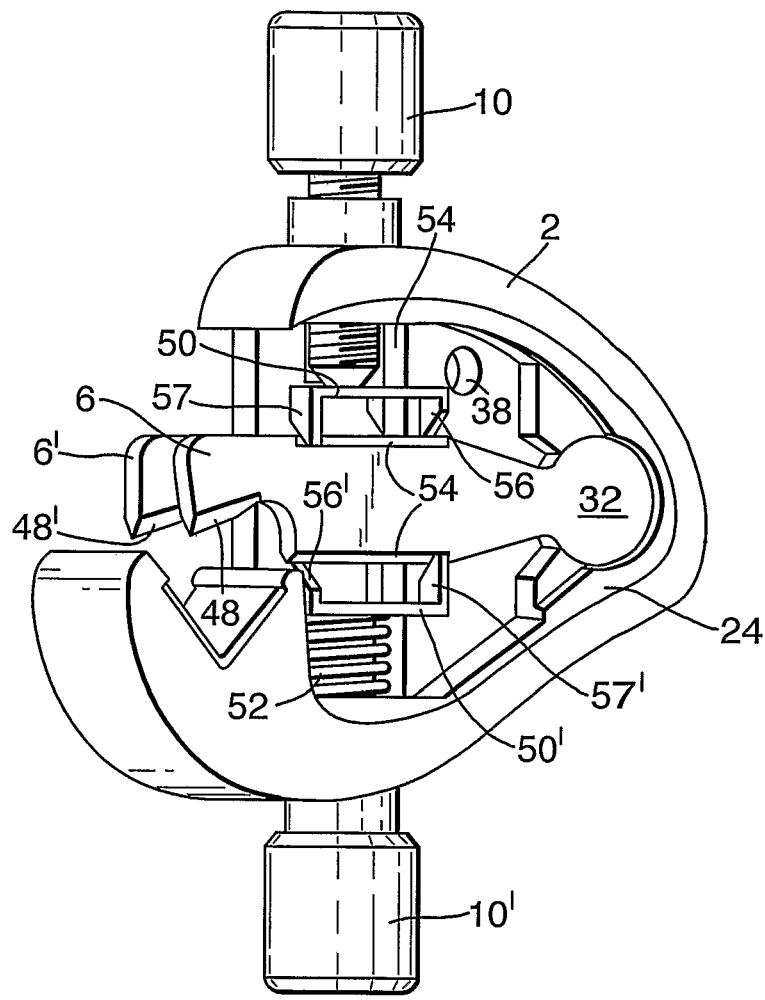
Figure 5:
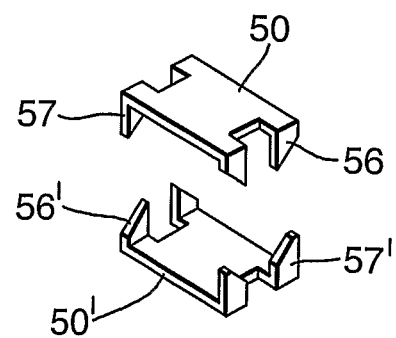

FIG. 3 presents an exploded view of the tool of FIG. 1;

FIG. 4 is a perspective view of another embodiment of the tool according to the invention, and FIG. 5 is a perspective view of the pressure pads of the embodiment of FIG. 4.

DETAILED DESCRIPTION OF THE PREFERRED EMBODIMENTS

Referring now to the drawings there is seen in FIG. 1 a fully assembled tool, according to the invention. Clearly seen are a recessed body 2, a V-block-like projection 4, two blades 6, 6', two covers 8, 8' and a setting thumbscrew 10.

Figure 2:
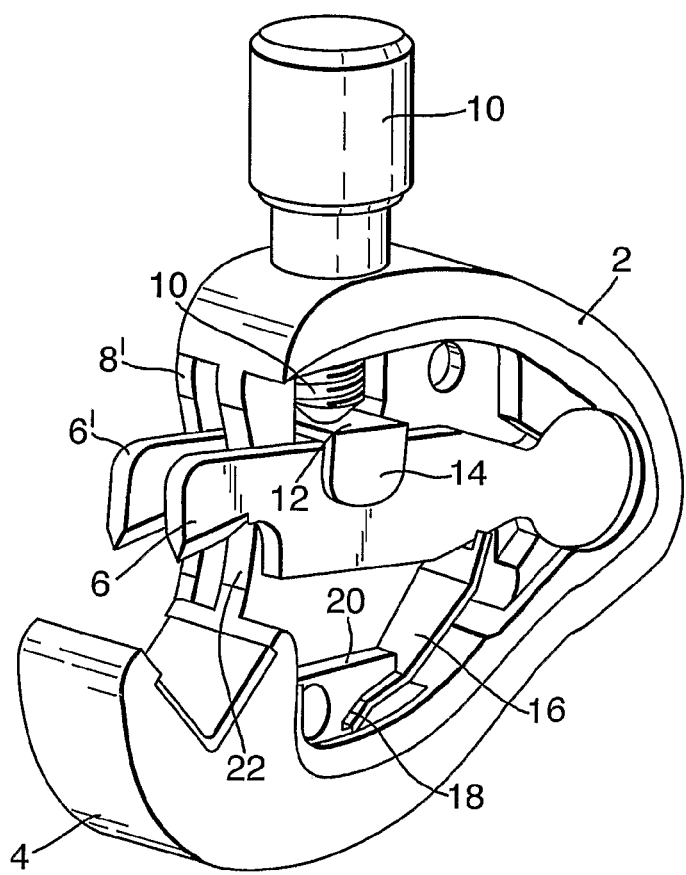

In FIG. 2, cover 8 has been removed, revealing the inside of the assembled tool. Also seen is a pressure pad 12 having two integral lobes 14, 14', of which only one can be seen. Further shown is a flat spring 16, the lower end of which is anchored in an appropriately shaped slot 18 in a lower, heavier portion 20 of a central wall 22 of the tool. The upper end of spring 16 is applied against blades 6, 6' and opposes their being lowered by thumbscrew 10. Conversely, when thumbscrew 10 is turned in the unscrewing sense, spring 16 raises blades 6, 6', maintaining the contact between pressure pad 12 and the end of thumbscrew 10.

In the exploded view of FIG. 3, there is seen body 2 with its multi-level recesses, the outermost of which is level 24 in which is seated cover 8, then level 26 which is defined by the above-mentioned wall portion 20, and finally level 28, which defines the central wall 22. Obviously, levels 24', 26' and 28' are on the opposite, unseen face of body 2. There are also seen substantially cylindrical recesses 30, 30' (with primed numerals referring to unseen face of body 2) extending in depth from levels 24, 24' to levels 28, 28'. Recesses 30, 30' serve as bearings for the appropriately shaped ends 32, 32' of blades 6, 6'. Recesses 30, 30' do not extend over a full 360° (see also FIG. 2) to permit blades 6, 6' to swivel over a predetermined range.

Further seen in the drawing of body 2 are four openings in central wall 22, a first, window-like opening 34 along which slides pressure pad 12 with its lobes 14 when the tool is adjusted for different screw diameters; a second, approximately triangular opening 36 through which passes, and in which flexes, spring 16 acting on blades 6, 6' and two holes 38, 38' through which pass hollow pins 40, 40' of covers 8, 8' which push-fit and interlock with, pins 42, 42', thereby, upon assembly, retaining covers 8, 8'.

Also seen is a hard-metal lining 44 which protects the active surfaces of V-block-like projection 4.

Blades 6, 6' are of substantially equal length and shape and have cutting faces 46, 46', with cutting edges 48, 48' and cutting angles $\alpha$ appropriate for the type of thread to be repaired.

As the distance between cutting edges 48, 48', must be as close as possible to a multiple of the pitch of the thread to be repaired, there must be some leeway in the confinement of blades 6, 6' by covers 8, 8' and recesses 30, 30', so that blades 6, 6', upon being lowered into the threads, may adjust themselves to that distance.

In operation, the screw or bolt to be repaired is placed into V-block 4, if necessary by first raising blades 6, 6' by rotating thumbscrew 10 in the counter-clockwise sense, and then lowering them until cutting edges 48, 48' have entered the tooth spaces, and the above-mentioned adjustment has been achieved. Then, the screw or bolt is rotated—or the tool is rotated about the stationary bolt—until the obstruction caused by the damage is shaved off. In case of severe damage, the repair work may have to be carried out in steps.

It will be appreciated that with the tool according to the present invention, illustrated in FIG. 4, differs from the embodiment of FIG. 1 in several details, the aim of which is to lock the distance between cutting edges 48, 48', once it has been adjusted in the manner described above. This is achieved by the provision of two pressure pads 50, 50', shown in FIG. 5, and two thumbscrews 10, 10'. To accommodate these compounds, as well as a helical compression spring 52, which replaces flat spring 16 of FIG. 3, window-like opening 34, now 54, has been lengthened to extend across the entire width of the tool. Furthermore, portions of the upper and lower edges of blades 6, 6' are provided with double-faced chamfers designed to interact with lobes 56, 57, 56' 57' of pressure pads 50, 50'.

FIG. 5 shows the two pressure pads 50, 50'. It is seen that pressure pads 50, 50' comprise two pairs of two lobes 56 and 57, respectively 56' and 57' each, with each pair extending in planes substantially perpendicular to the major surfaces of body 2.

It is further seen that each of the lobes is configured as an inclined plane, with the planes of one of these lobe pairs being outwardly inclined, while the planes of the other lobe pair are inwardly inclined. In assembly, the outwardly inclined lobe planes of pressure pad 50 face the inwardly inclined planes of pad 50', and vice-versa.

In operation, the distance between cutting edges 48, 48' is adjusted as described, then thumbscrews 10,10' are slowly alternatingly rotated. As lobes 57, riding on the outward face of the double-chamfer and lobes 56 riding on the inward face of the chamfer are opposed by lobes 56' and 57' which have the opposite effect, a locking action is produced which maintains the distance between cutting edges 48, 48' even with seriously damaged threads.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tool for repair of damaged threads of screws, comprising:
    a body having a projecting portion for accommodating a screw to be repaired and having two recessed major surfaces;
    two blades, each having a rear end hingedly articulated in said body and a front end in the shape of a cutting face substantially fitting the type of thread to be repaired;
    a thumbscrew adapted to exert pressure on said blades against a biasing force of a substantially flat spring, one end of which is anchored in said body and another end of which is applied against said blades to alter the distance between said cutting faces and said projecting portion to accommodate screws of different diameters, and
    wherein said rear ends of said blades are configured such that they are capable of serving as pivots, whereby said blades are hingedly articulated to said body.

2. The tool as claimed in claim 1, wherein said two blades are of a substantially equal length.

3. The tool as claimed in claim 1, wherein said pressure is applied via a pressure pad straddling said blades by means of lobes integral with said pressure pad.

4. The tool as claimed in claim 3, wherein said pressure is applied via two pressure pads straddling said blades from above and below, respectively, by means of lobes integral with said pressure pads.

5. The tool as claimed in claim 3, wherein said pressure pad comprises two lobes extending in planes substantially parallel to said major surfaces of said body.

6. The tool as claimed in claim 3, wherein said pressure pad comprises two pairs of two lobes each, each pair extending in planes substantially perpendicular to said major surfaces of said body.

7. The tool as claimed in claim 6, wherein each lobe of said pairs of lobes is configured as an inclined plane, the planes of one of said pairs being outwardly inclined, while the planes of the other one of said pairs are inwardly inclined.

8. The tool as claimed in claim 1, wherein said projecting portion is in the form of a V-block.

9. The tool as claimed in claim 8, wherein the active surfaces of said V-block are provided with hard-metal linings.

10. The tool as claimed in claim 1, further comprising cover plates seated in said body and provided with interlocking projections whereby, upon assembly, said cover plates are affixed to said body.

11. The tool as claimed in claim 1, wherein at least portions of the upper and lower straight edges of said blades are provided with chamfers adapted to cooperate with inclined planes of said lobes.

12. A tool for repair of damaged threads of screws, comprising:
    a body having a projecting portion for accommodating a screw to be repaired and having two recessed major surfaces;
    two blades, each having a rear end hingedly articulated in said body and a front end in the shape of a cutting face substantially fitting the type of thread to be repaired;
    means to alter the distance between said cutting faces and said projecting portion to accommodate screws of different diameters; and
    cover plates seated in said body and provided with interlocking projections whereby, upon assembly, said cover plates are affixed to said body,
    wherein said rear ends of said blades are configured in such a way that they are capable of serving as pivots, whereby said blades are hingedly articulated to said body.

13. The tool as claimed in claim 12, further comprising two pressure pads which comprise two pairs of two lobes each, each pair extending in planes substantially perpendicular to said major surfaces of said body.

14. The tool as claimed in claim 13, wherein each lobe of said pairs of lobes is configured as an inclined plane, the planes of one of said pairs being outwardly inclined, while the planes of the other one of said pairs are inwardly inclined.

15. The tool as claimed in claim 13, wherein said means to alter the distance is a helical compression spring seated around one of two thumbscrews.

16. A tool for repair of damaged threads of screws, comprising:
- a body having a projecting portion for accommodating a screw to be repaired and having two recessed major surfaces;
- two blades, each having a rear end hingedly articulated in said body and a front end in the shape of a cuffing face substantially fitting the type of thread to be repaired;
- two thumbscrews adapted to exert pressure on said blades against a biasing force of a spring so as to alter the distance between said cuffing faces and said projecting portion to accommodate screws of different diameters, wherein
- said pressure is applied via two pressure pads straddling said blades from above and below, respectively, by means of lobes integral with said pressure pads; and
- the rear ends of said blades are configured in such a way that they are capable of serving as pivots, whereby said blades are hingedly articulated to said body.

17. The tool as claimed in claim 16, wherein each of said pressure pads comprises two pairs of two lobes each, each pair extending in planes substantially perpendicular to said major surfaces of said body.

18. The tool as claimed in claim 17, wherein each lobe of said pairs of lobes is configured as an inclined plane, the planes of one of said pairs being outwardly inclined, while the planes of the other one of said pairs are inwardly inclined.

* * * * *